US008591067B2

(12) United States Patent
Lin et al.

(10) Patent No.: US 8,591,067 B2
(45) Date of Patent: Nov. 26, 2013

(54) LIGHT SOURCE DEVICE

(75) Inventors: Ming-Te Lin, Taipei County (TW); Ming-Yao Lin, Taipei County (TW); Kuang-Yu Tai, Hsinchu (TW); Po-Cheng Yang, Taipei (TW)

(73) Assignees: Industrial Technology Research Institute, Hsinchu (TW); Cheer Shine Lighting Enterprises Ltd., Taipei (TW)

( * ) Notice: Subject to any disclaimer, the term of this patent is extended or adjusted under 35 U.S.C. 154(b) by 118 days.

(21) Appl. No.: 12/944,698

(22) Filed: Nov. 11, 2010

(65) Prior Publication Data

US 2012/0032588 A1 Feb. 9, 2012

(30) Foreign Application Priority Data

Aug. 6, 2010 (TW) ............................... 99126221 A

(51) Int. Cl.
*F21V 29/00* (2006.01)
*B60Q 1/06* (2006.01)

(52) U.S. Cl.
USPC .......................................... 362/294; 362/373

(58) Field of Classification Search
USPC .................................................. 362/294, 373
See application file for complete search history.

(56) References Cited

U.S. PATENT DOCUMENTS

| | | | | |
|---|---|---|---|---|
| 5,947,592 | A * | 9/1999 | Barlow ......................... | 362/345 |
| 6,864,513 | B2 | 3/2005 | Lin et al. | |
| 6,982,518 | B2 | 1/2006 | Chou et al. | |
| 7,144,135 | B2 | 12/2006 | Martin et al. | |
| 7,461,951 | B2 * | 12/2008 | Chou et al. .................... | 362/294 |
| 7,497,596 | B2 | 3/2009 | Ge | |
| 7,553,028 | B2 | 6/2009 | Engle et al. | |
| 7,976,307 | B2 * | 7/2011 | Plank et al. ..................... | 433/29 |
| 8,143,769 | B2 * | 3/2012 | Li .................................. | 313/46 |
| 8,303,136 | B2 * | 11/2012 | Lai et al. ....................... | 362/294 |
| 2008/0093998 | A1 | 4/2008 | Dennery et al. | |

(Continued)

FOREIGN PATENT DOCUMENTS

| | | |
|---|---|---|
| CN | 2876552 | 3/2007 |
| CN | 201078658 | 6/2008 |

(Continued)

OTHER PUBLICATIONS

"First Office Action of China Counterpart Application", issued on Jan. 31, 2013, p. 1-p. 8, in which the listed references were cited.
"Office Action of China Counterpart Application", issued on Jul. 22, 2013, p1-p7, in which the listed reference was cited.

*Primary Examiner* — David J Makiya
(74) *Attorney, Agent, or Firm* — Jianq Chyun IP Office

(57) ABSTRACT

A light source device having a good heat dissipation capability is disclosed, in which heat generated by a light emitting device is conducted to a base fabricated by a porous material through a heat conducting mask or a heat conducting pipe. Due to a large area contact between the heat conducting mask or the heat conducting pipe and the base, the heat can be evenly conducted to the base, so that the base can absorb the heat and dissipate the heat to external, so as to improve a heat dissipation efficiency. Moreover, in the light source device of the disclosure, heat exchange of the light emitting device can be directly carried on through air convection, so that the heat generated by the light emitting device can be taken away from the light source device through heat exchange of cool air.

24 Claims, 19 Drawing Sheets

400

(56) References Cited

U.S. PATENT DOCUMENTS

| | | | | |
|---|---|---|---|---|
| 2009/0027889 | A1 | 1/2009 | Kang et al. | |
| 2009/0200908 | A1 | 8/2009 | Mart et al. | |
| 2009/0244899 | A1* | 10/2009 | Chyn | 362/294 |
| 2010/0214781 | A1* | 8/2010 | Chiu et al. | 362/249.06 |
| 2010/0237782 | A1* | 9/2010 | Horng et al. | 315/117 |
| 2010/0259934 | A1* | 10/2010 | Liu et al. | 362/294 |
| 2011/0051414 | A1* | 3/2011 | Bailey et al. | 362/235 |
| 2011/0254421 | A1* | 10/2011 | Thomas | 313/46 |
| 2011/0298350 | A1* | 12/2011 | van de Ven | 313/46 |

FOREIGN PATENT DOCUMENTS

| | | |
|---|---|---|
| CN | 201314509 | 9/2009 |
| CN | 101701701 | 5/2010 |
| EP | 2105659 | 9/2009 |
| GB | 2464484 | 4/2010 |
| TW | I263008 | 10/2006 |
| TW | 200940881 | 10/2009 |

* cited by examiner

LIGHT SOURCE DEVICE

CROSS-REFERENCE TO RELATED APPLICATION

This application claims the priority benefit of Taiwan application serial no. 99126221, filed on Aug. 6, 2010. The entirety of the above-mentioned patent application is hereby incorporated by reference herein and made a part of specification.

BACKGROUND

1. Technical Field

The disclosure relates to a light source device, more particularly, relates to a light source device integrated with a heat dissipation structure for improving a heat dissipation efficiency.

2. Technical Art

Since conventional lamps do not satisfy a requirement of energy conservation and may aggravate an environmental problem due to it high power consumption, a lighting technique using light emitting diodes (LED) to replace the conventional lamps is quickly developed recently. However, a main problem of the LED is that a part of input power is consumed to generate heat, and such heat may reduce a light emitting efficiency and a service life of the LED if it cannot be effectively dissipated.

According to a current technique, the LED is disposed on a surface of a base fabricated by a porous material, so that the heat can be absorbed by the base. However, since the porous material has a poor thermal conductivity, the heat is concentrated at an upper portion of the base, which may limit a heat dissipation effect.

SUMMARY

The disclosure provides a light source device including a base, a heat conducting mask and a light emitting device. The based is fabricated by a porous material. The heat conducting mask covers a top of the base, and contacts a portion of surface of the top of the base. The light emitting device is connected to the heat conducting mask.

The disclosure provides another light source device including a base, a heat conducting pipe and a light emitting device. The base is fabricated by a porous material, and has a hollow column on top of the base. The heat conducting pipe is inserted in the hollow column, and a portion of surface of the heat conducting pipe contacts the hollow column. Moreover, the light emitting device is connected to a top of the heat conducting pipe.

The disclosure further provides a light source device including a first diversion pipe, a second diversion pipe, a light emitting device and a fan. The first diversion pipe has a first end and a second end opposite to the first end, and the first diversion pipe has a first air channel. The second diversion pipe has a first end and a second end opposite to the first end. The first diversion pipe is sleeved by the second diversion pipe. The first end of the first diversion pipe is adjacent to the first end of the second diversion pipe, and a second air channel is formed between the first diversion pipe and the second diversion pipe. The light emitting device is connected to the first end of the second diversion pipe, and the first air channel and the second air channel are mutually connected at a place where the light emitting device is located. The fan is disposed at the second end of the first diversion pipe.

The disclosure provides a light source device including a diversion pipe, a base, a light emitting device and a lamp mask. The diversion pipe has a first end and a second end opposite to the first end, and has a first air channel. The base is connected to the second end of the diversion pipe. The light emitting device is connected to the first end of the diversion pipe. The lamp mask is connected to the base, and the lamp mask and the base commonly form a containing space. The diversion pipe and the light emitting device are located in the containing space. The lamp mask has a second air channel connected to external, and the first air channel and the second air channel are connected at a place where the light emitting device is located.

In order to make the aforementioned and other features and advantages of the disclosure comprehensible, several embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

First Embodiment

Figure 1:
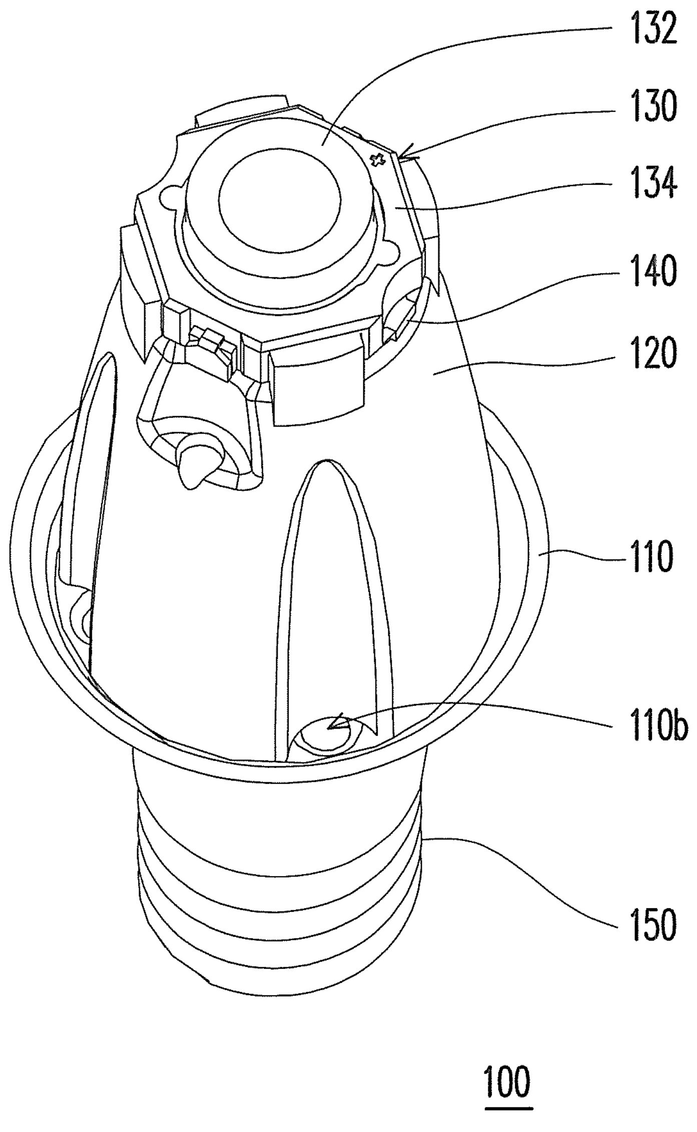
FIG. 1 is a three-dimensional view of a light source device according to a first embodiment of the disclosure.
Figure 2:
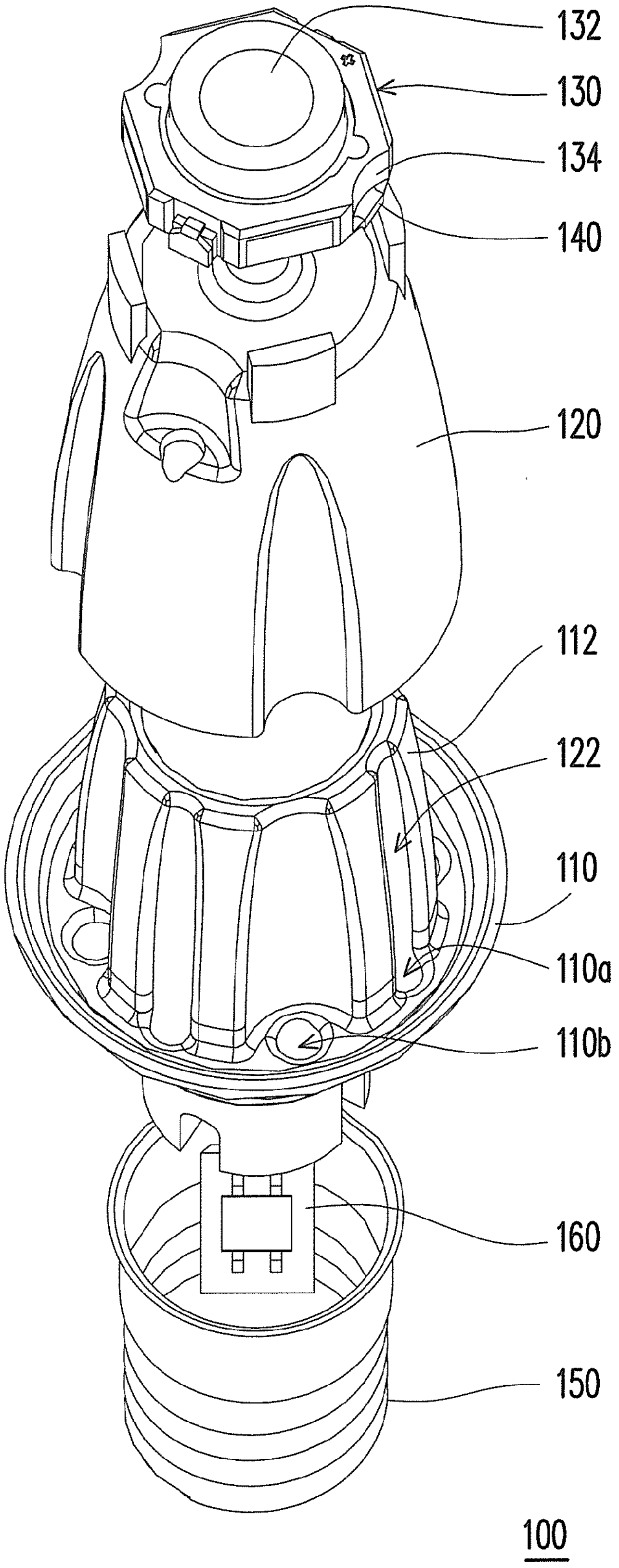
FIG. 2 is a three-dimensional exploded view of the light source device of FIG. 1.
Figure 3:
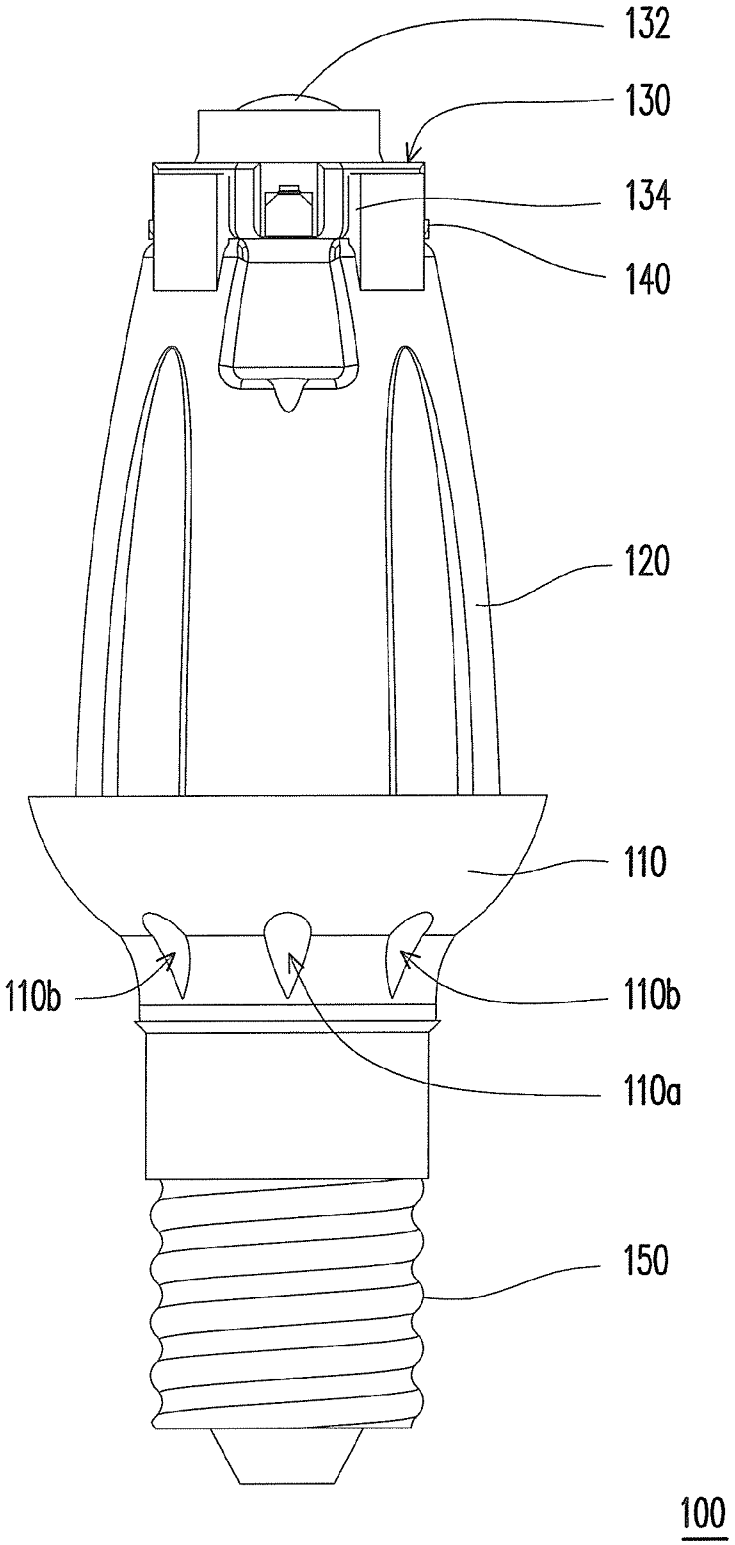
FIG. 3 is a side view of the light source device of FIG. 1.
Figure 4:
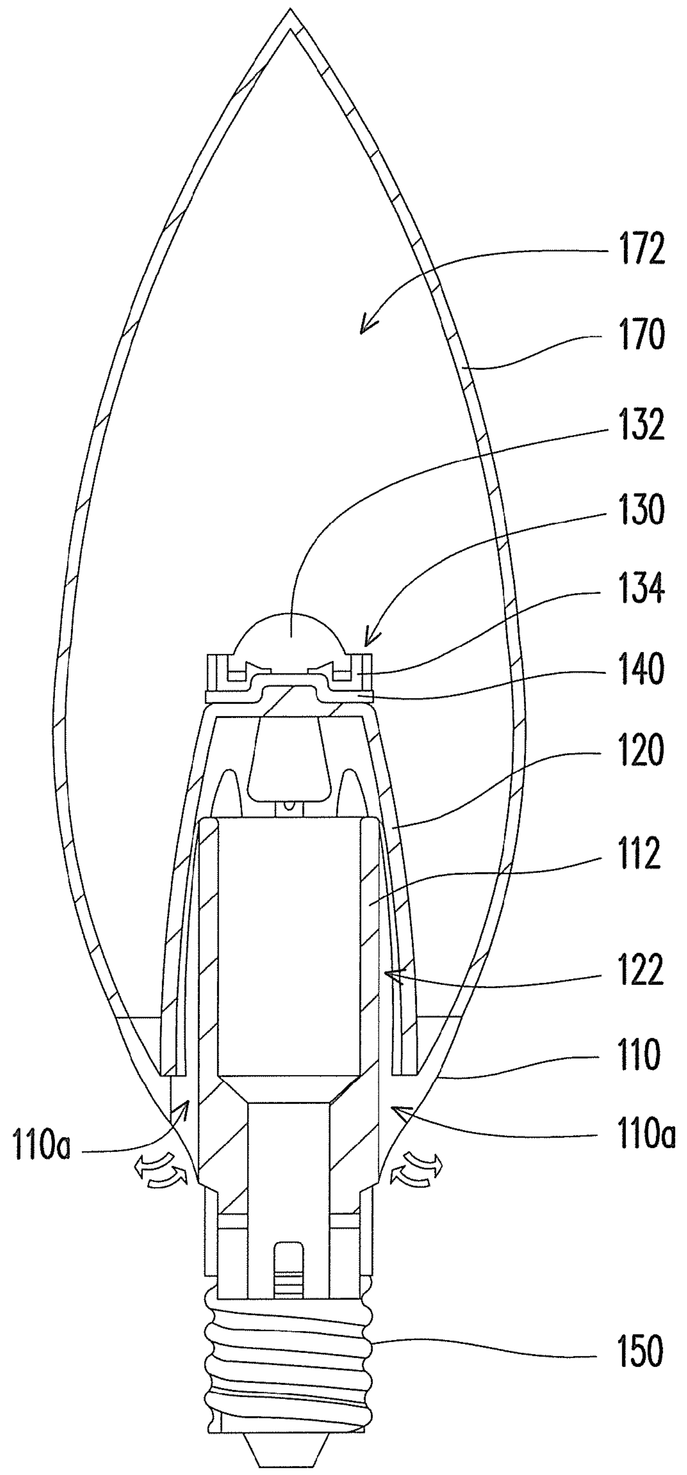
FIG. 4 is a cross-sectional side view of the light source device of FIG. 1.

FIG. 1 is a three-dimensional view of a light source device according to a first exemplary embodiment of the disclosure. FIG. 2 is a three-dimensional exploded view of the light source device of FIG. 1. FIG. 3 is a side view of the light source device of FIG. 1. FIG. 4 is a cross-sectional side view of the light source device of FIG. 1.

Referring to FIG. 1-FIG. 4, the light source device 100 includes a base 110, a heat conducting mask 120 and a light emitting device 130. The base 110 is fabricated by a porous material, for example, a porcelain material or a porous metal material, and in specific, for example, aluminium oxide, zirconium oxide, etc. In the embodiment, a top of the base 110 has a hollow column 112 roughly having a cone shape. The hollow column 112 is sleeved by the heat conducting mask 120, and an inner wall of the heat conducting mask 120 contacts a portion of an outer surface of the hollow column 112. The heat conducting mask 120 is, for example, fabricated by a metal material with a good thermal conductivity, for example, aluminium, copper, etc.

The light emitting device 130 is, for example, a light emitting diode (LED), which is positioned or fixed or detachably disposed on a top surface of the heat conducting mask 120. The light emitting device 130 has a light emitting portion 132. A bottom surface of the light emitting portion 132 is connected to a heat conduction slug 140, and a positioning base 134 wraps the light emitting portion 132 and the heat conducting slug 140. A bottom surface of the heat conducting slug 140 leans against the top surface of the heat conducting mask 120, so that heat generated by the light emitting device 130 can be conducted to the heat conducting mask 120 through the heat conducting slug 140. Moreover, since the heat conducting mask 120 partially contacts the outer surface of the hollow column 112, the heat can be conducted to the hollow column 112 through the heat conducting mask 120, so as to increase a heat dissipation area.

In the embodiment, the hollow column 112 is fabricated by a porous material, in which a relatively great heat dissipation area exists between it and the air, and the hollow column 112 has a high heat absorption capability and high thermal capacity. In other words, the hollow column 112 can store a large amount of heat, and there is a good heat exchange effect between the hollow column 112 and the external. In this way, the light source device 100 can evenly distribute the heat generated by the light emitting device 130 to the bottom of the hollow column 112 within the base 110 through a large area contact between the heat conducting mask 120 and the hollow column 112, and the hollow column 112 absorbs the heat and exchanges the heat to the external.

In the embodiment, an outer surface of the base 110 may have one or a plurality of first pores 110*a*, and an air channel 122 is, for example, formed on the hollow column 112 at a position other than the contact area between the heat conducting mask 120 and the hollow column 112. As shown in FIG. 2, FIG. 3 and FIG. 4, the air channel 122 can be connected to external through the first pores 110*a*, and the air channel 122 is connected to an internal space of the hollow column 112 at an upper edge of the hollow column 112. Therefore, the heat exchange efficiency can be further improved through convection of the hot and the cold air inside and outside the base 110.

Moreover, as shown in FIG. 2, a power connection base 150 can be disposed at the bottom of the base 110, and a control module 160 can be disposed inside the base 110. The power connection base 150 can be a thread-shaped pin or an electrical pin. The thread-shaped power connection base 150 is, for example, in form of E12 or E27, and the electrical pin power connection base 150 is, for example, in form of MR16 or GU10. The control module 160 is, for example, a control circuit board, which is electrically connected between the light emitting device 130 and the power connection base 150. When the power connection base 150 is connected to an external power, the control module 160 can conduct electricity of the external power to the light emitting device 130, so as to drive and control the light emitting device 130.

In the embodiment, the light source device 100 may further include a lamp mask 170. The lamp mask 170 is connected to the base 110, and the lamp mask 170 and the base 110 commonly form a containing space 172 for containing the heat conducting mask 120 and the light emitting device 130. Moreover, the lamp mask 170 can be a transparent or a translucent shell, which is, for example, fabricated by a glass material or a plastic material. Moreover, the base 110 may further have one or a plurality of second pores 110*b*, and the second pores 110*b* are connected to the containing space 172, so as to facilitate convection of the air inside the lamp mask 170 and external, and accordingly increase the heat dissipation effect.

According to the above descriptions, the heat generated by the light emitting device 130 can be conducted to the hollow column 112 on the base 110 through the heat conducting mask 120 having a good heat conducting capability, so as to achieve a good heat exchange effect by the hollow column 112 having the high heat absorption capability and high thermal capacity. Moreover, the base 110 has the first pores 110*a* and the second pores 110*b*, so that the air channel 122 and the internal space of the lamp mask 170 can be connected to external, so as to further increase the heat dissipation effect. According to the above design, a normal operation of the light emitting device 130 can be effectively ensured.

Figure 5:
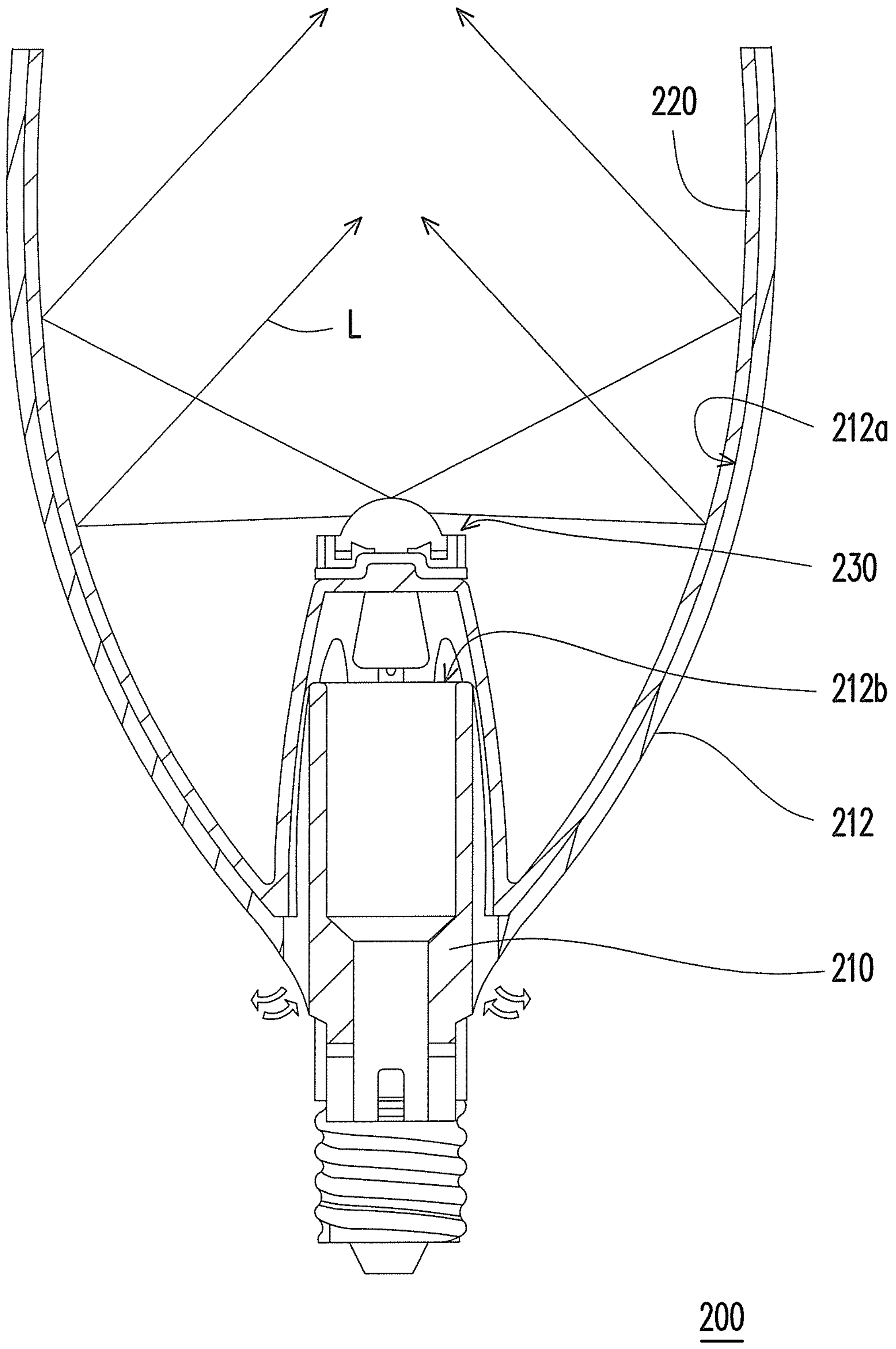
FIG. 5 is a cross-sectional side view of another light source device according to the first embodiment of the disclosure.

FIG. 5 is a cross-sectional side view of another light source device according to the first embodiment of the disclosure. The light source device 200 of the embodiment is similar to the light source device 100 shown in FIG. 4, and a main difference there between is that a top of a base 210 is extended to form a concave cup structure 212, and a bottom of a heat conducting mask 220 is extended to form a corresponding concave shape, so that the heat conducting mask 220 covers a concave surface 212*a* on the top of the concave cup structure 212. The light emitting device 230 is disposed on a platform 212*b* inside the concave cup structure 212. The concave cup structure 212 is defined as that the top of the base 210 is circularly extended upwards to form a concave cup-shaped structure. The heat conducting mask 220 is defined as that a side edge of the bottom of the heat conducting mask 120 shown in FIG. 1-FIG. 4 is extended upwards to form a concave cup-shaped structure surrounding the heat conducting mask 120. The two cup-shaped structures are attached. The light emitting device 230 is disposed on a platform 212*b* inside the concave cup structure 212, wherein the platform 212*b* is defined as the top of the heat conducting mask 120 shown in FIG. 1-FIG. 4. Heights of the concave cup structure 212 and the heat conducting mask 220 at peripheral of the light emitting device 230 can be greater than a height of the light emitting device 230. The heat conducting mask 220 can be fabricated by a material with a good reflectivity, for example, metal, etc. In this way, the heat conducting mask 220 may not only conduct the heat generated by the light emitting device 230 to the concave cup structure 212, but may also simultaneously serve as a reflection mask of a light L emitted from the light emitting device 230, so as to improve a light utilization efficiency and adjust an output light shape of the light source device 200.

Second Embodiment

Figure 6:
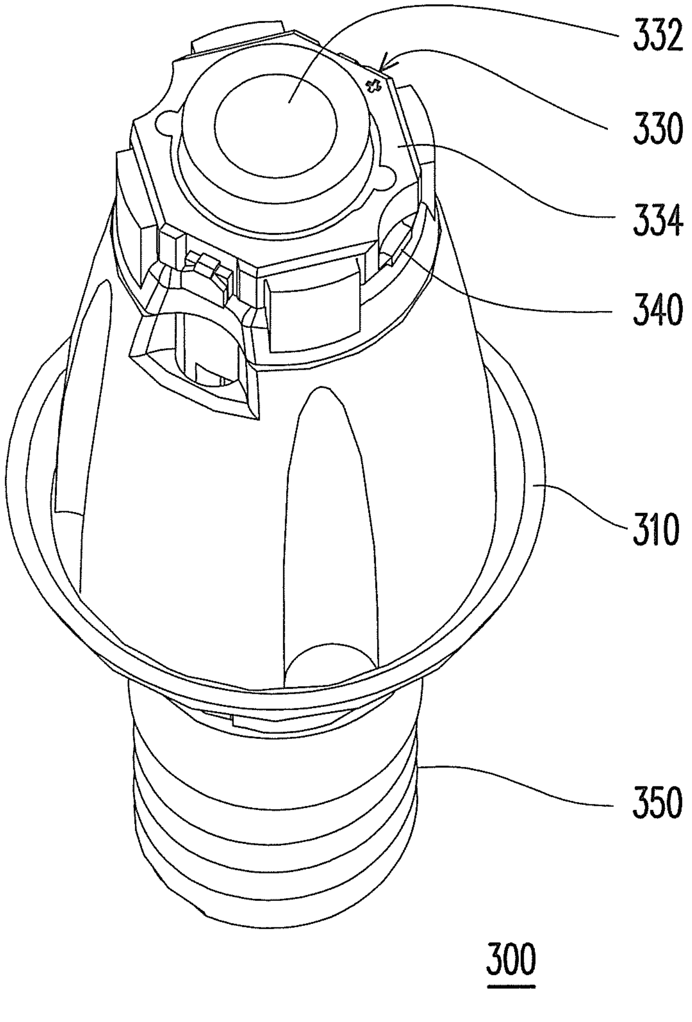
FIG. 6 is a three-dimensional view of a light source device according to a second embodiment of the disclosure.
Figure 7:
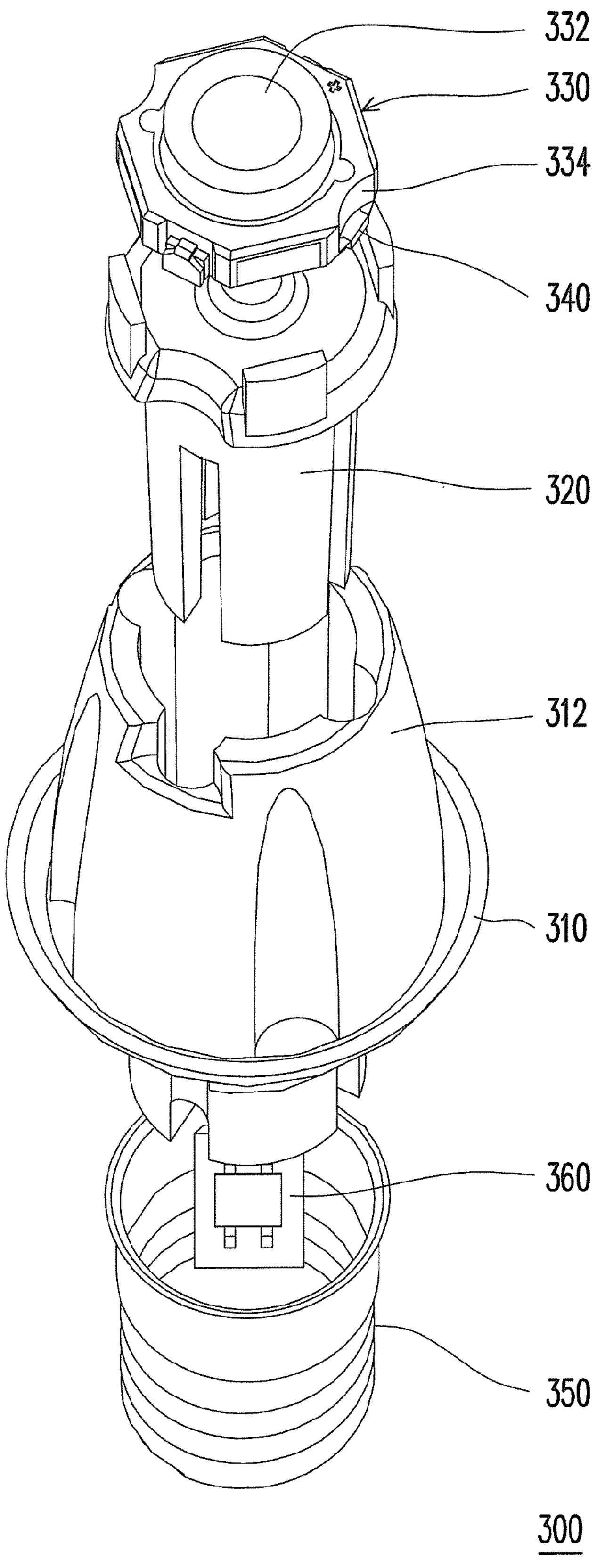
FIG. 7 is a three-dimensional exploded view of the light source device of FIG. 6.
Figure 8:
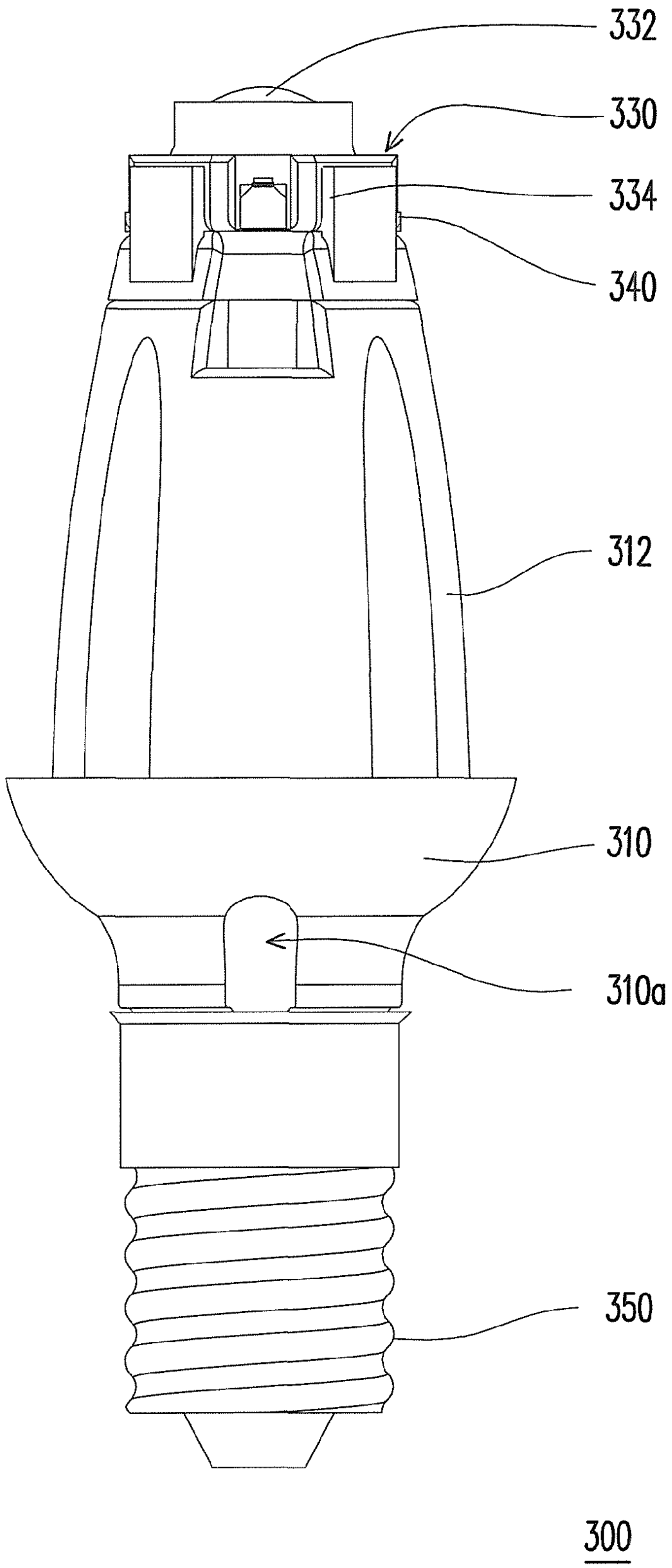
FIG. 8 is a side view of the light source device of FIG. 6.
Figure 9:
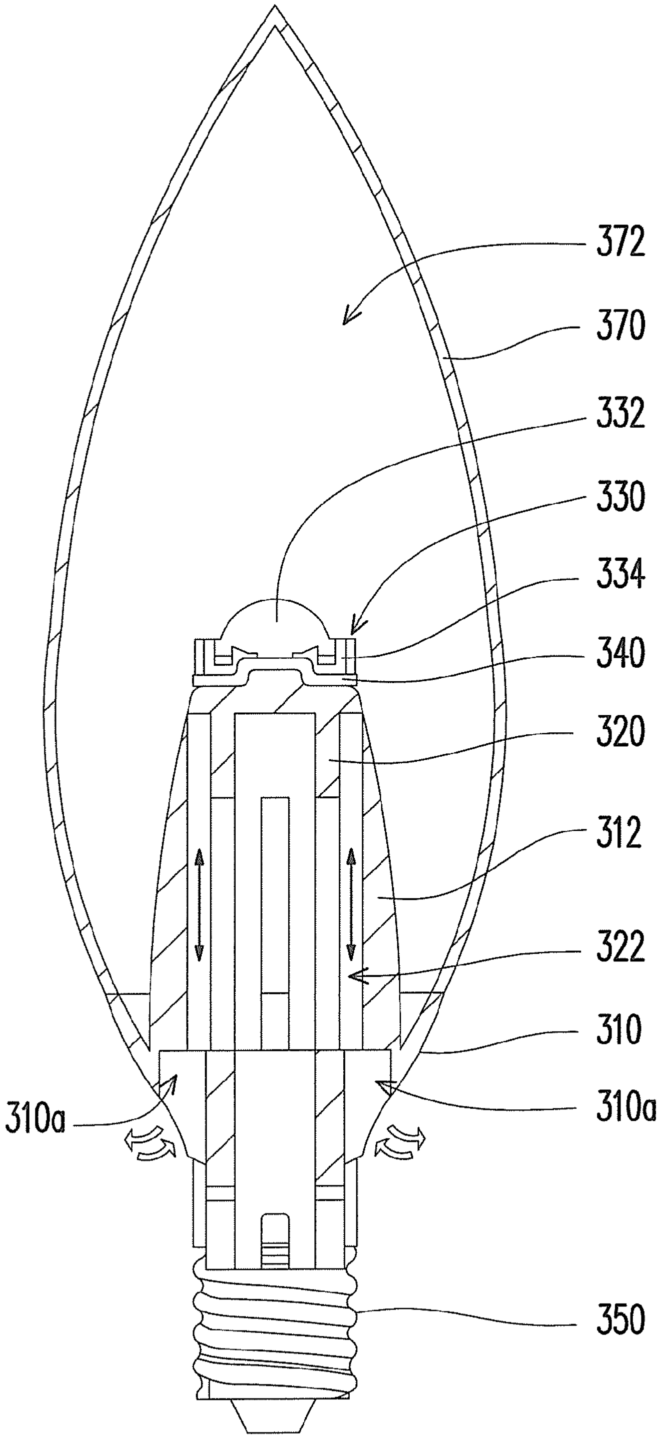
FIG. 9 is a cross-sectional side view of the light source device of FIG. 6.

FIG. 6 is a three-dimensional view of a light source device according to a second embodiment of the disclosure. FIG. 7 is a three-dimensional exploded view of the light source device of FIG. 6. FIG. 8 is a side view of the light source device of FIG. 6. FIG. 9 is a cross-sectional side view of the light source device of FIG. 6.

Referring to FIG. 6-FIG. 9, the light source device 300 includes a base 310, a heat conducting pipe 320 and a light emitting device 330. The base 310 is fabricated by a porous material, for example, a porous porcelain material or a porous metal material, and in specific, for example, aluminium oxide, zirconium oxide, etc. In the embodiment, a top of the base 310 has a hollow column 312 roughly having a cone shape. The heat conducting pipe 320 is inserted in the hollow column 312, and a portion of outer surface of the heat conducting pipe 320 contacts an inner surface of the hollow column 312. The heat conducting pipe 320 is, for example, fabricated by a metal material with a good thermal conductivity, for example, aluminium, copper, etc.

The light emitting device 330 is, for example, a LED, which is located on the top of the heat conducting pipe 320. The light emitting device 330 has a light emitting portion 332. A bottom surface of the light emitting portion 332 is connected to a heat conduction slug 340, and a positioning base 334 wraps the light emitting portion 332 and the heat conducting slug 340. A bottom surface of the heat conducting slug 340 leans against the top of the heat conducting pipe 320, so that the heat generated by the light emitting device 330 can be conducted to the heat conducting pipe 320 through the heat conducting slug 340. Moreover, since the heat conducting pipe 320 partially contacts the inner surface of the hollow column 312, the heat can be conducted to the hollow column 312 through the heat conducting pipe 320.

In the embodiment, the hollow column 312 is fabricated by a porous material, in which a relatively great heat dissipation area exists between it and the air, and the hollow column 312 has a high heat absorption capability. In other words, the hollow column 312 can store a large amount of heat, and there is a good heat dissipation effect between the hollow column 312 and the external. In this way, the light source device 300 can evenly distribute the heat generated by the light emitting device 330 to the hollow column 312 in the base 310 through a large area contact between the heat conducting pipe 320 and the hollow column 312, and the hollow column 312 absorbs the heat and exchanges the heat to the external.

In the embodiment, an outer surface of the base 310 may have one or a plurality of first pores 310*a*, and an air channel 322 is, for example, formed at a position other than the contact area between the heat conducting pipe 320 and the hollow column 312. The air channel 322 and an internal space of the heat conducting pipe 320 can be connected to external through the first pores 310*a*, so that heat exchange efficiency can be improved through convection of the hot and the cold air inside and outside the base 310.

Moreover, a power connection base 350 can be disposed at the bottom of the base 310, and a control module 360 can be disposed inside the base 310. The power connection base 350 can be a thread-shaped pin or an electrical pin. The thread-shaped power connection base 350 is, for example, in form of E12 or E27, and the electrical pin power connection base 350 is, for example, in form of MR16 or GU10.The control module 360 is, for example, a control circuit board, which is electrically connected between the light emitting device 330 and the power connection base 350. When the power connection base 350 is connected to an external power, the control module 360 can conduct electricity of the external power to the light emitting device 330, so as to drive and control the light emitting device 330.

In the embodiment, the light source device 300 may further includes a lamp mask 370. The lamp mask 370 is connected to the base 310, and the lamp mask 370 and the base 310 commonly form a containing space 372 for containing the heat conducting pipe 320 and the light emitting device 330. Moreover, the lamp mask 370 can be a transparent or a translucent shell, which is, for example, fabricated by a glass material or a plastic material. Certainly, the second pores (not shown, referring to the second pores 110*b* of FIGS. 1-4) can be formed on the base 310 as that of the aforementioned embodiment. In this way, the second pores can be connected to the containing space 372, so as to facilitate convection of the air inside the lamp mask 370 and the external, and accordingly increase the heat dissipation effect.

According to the above descriptions, the heat generated by the light emitting device 330 can be conducted to the hollow column 312 on the base 310 through the heat conducting pipe 320 having a good heat conducting capability, so as to achieve a good heat exchange effect through the hollow column 312 having the high heat absorption capability and high thermal capacity. Moreover, the base 310 has a first pores 310*a*, so that the air channel 322 and the internal space of the hollow column 312 can be connected to external, so as to further increase the heat dissipation effect. According to the above design, a normal operation of the light emitting device 330 can be effectively ensured.

Third Embodiment

Figure 10:
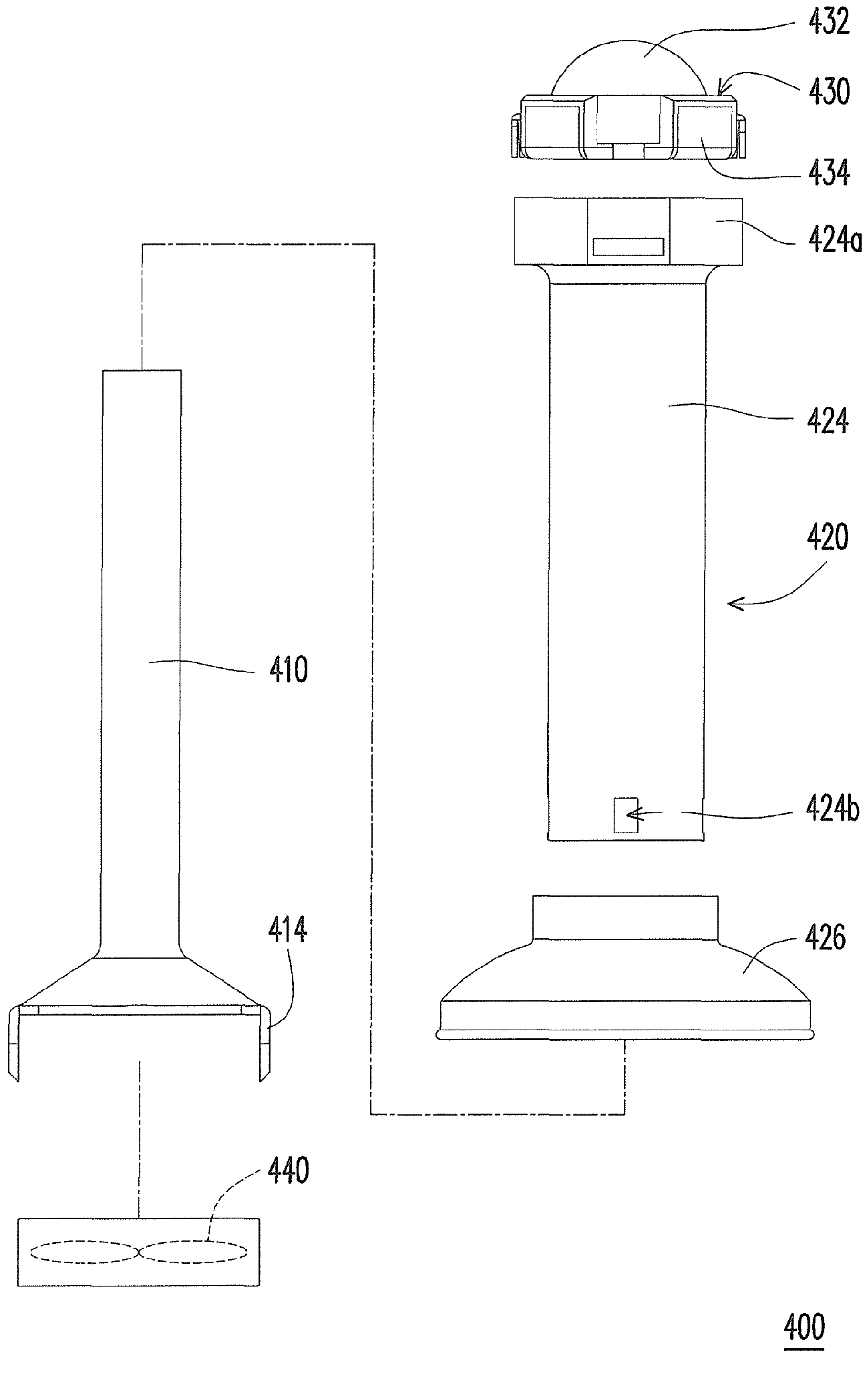
FIG. 10 is a three-dimensional view of a light source device according to a third embodiment of the disclosure.
Figure 11:
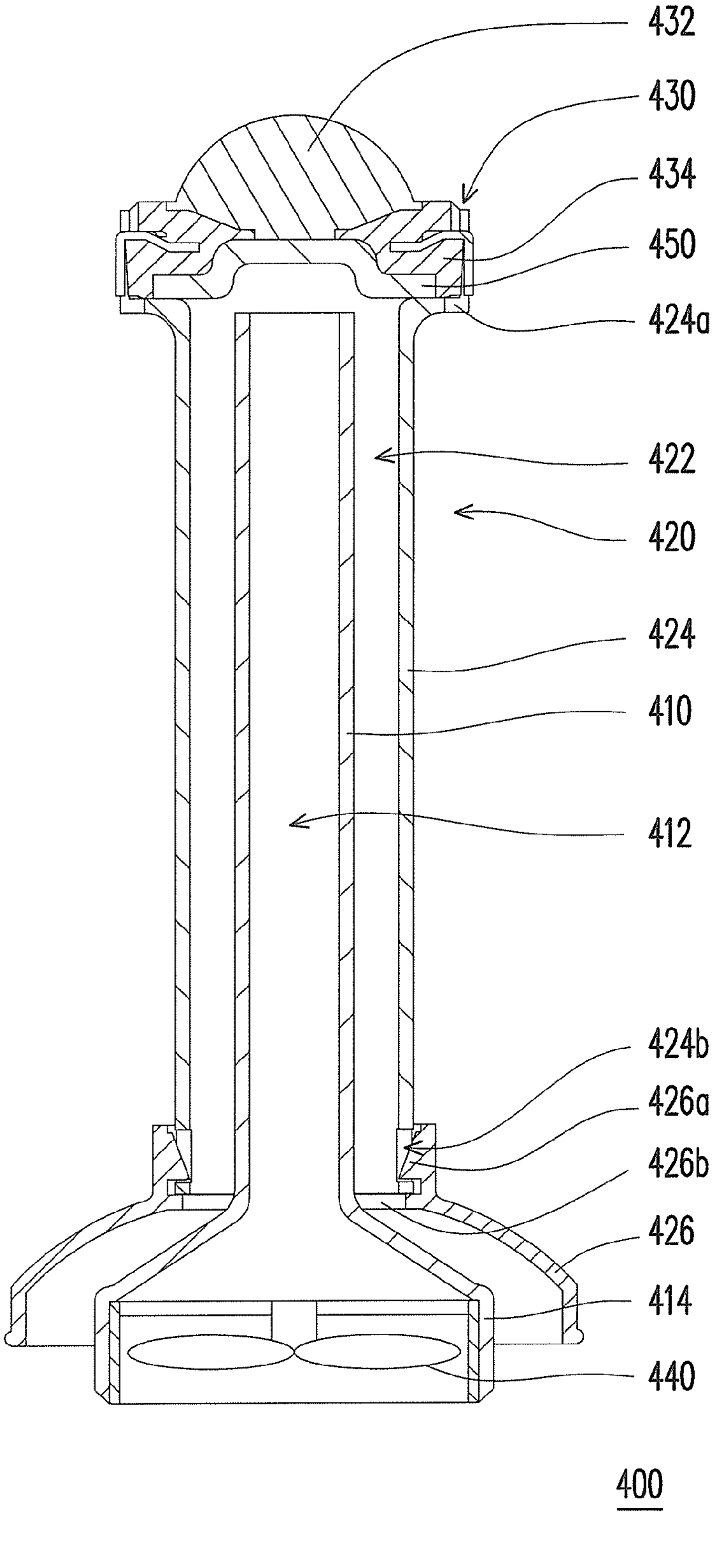
FIG. 11 is a cross-sectional side view of the light source device of FIG. 10.

FIG. 10 is a three-dimensional view of a light source device according to a third embodiment of the disclosure. FIG. 11 is a cross-sectional side view of the light source device of FIG. 10.

Referring to FIG. 10 and FIG. 11, the light source device 400 includes a first diversion pipe 410, a second diversion pipe 420, a light emitting device 430 and a fan 440. The first diversion pipe 410 has a column shape and has a first air channel 412 therein, and the first diversion pipe 410 has a diverging-like positioning portion 414 at a lower edge thereof. The second diversion pipe 420 can be fabricated by a material having a thermal conduction coefficient higher than that of the material of the first diversion pipe 410. In detail, the material of the first diversion pipe 410 can be a porous material such as a porcelain material, a porous metal material, etc., and the material of the second diversion pipe 420 can be a metal material. The first diversion pipe 410 is sleeved by the second diversion pipe 420, and a second air channel 422 is formed between an inner wall of the second diversion pipe 420 and an outer wall of the first diversion pipe 410. In detail, the second diversion pipe 420 includes a sleeve 424 and a base portion 426. A plurality of protrusions 426*a* is convexly formed in interval on an inner wall at a top part of the base portion 426, an upper edge of the sleeve 424 is bended to form a fixing portion 424*a*, and fixing grooves 424*b* are concavely formed on an outer surface of a lower edge of the sleeve 424, wherein the fixing grooves 424*b* are engaged to the protrusions 426*a* of the base portion 426. Moreover, the base portion 426 has a supporting portion 426*b* supporting an outer edge of the first diversion pipe 410, so as to avoid a contact between the first diversion pipe 410 and the sleeve 424.

The fan 440 is disposed in the positioning portion 414 at the lower edge of the first diversion pipe 410, which is used for extracting cool air from external for driving into the first air channel 412. The light emitting device 430 is, for example, a LED, which is positioned on the fixing portion 424*a* of the sleeve 424 of the second diversion pipe 420. The light emitting device 430 has a light emitting portion 432. A bottom surface of the light emitting portion 432 is connected to a heat conduction slug 450, and a positioning base 434 wraps the light emitting portion 432 and the heat conducting slug 450. Moreover, an outer edge of a bottom surface of the heat conducting slug 450 leans against the fixing portion 424*a*, so that the first air channel 412 and the second air channel 422 are connected at the upper edge of the first diversion pipe 410.

Figure 12:
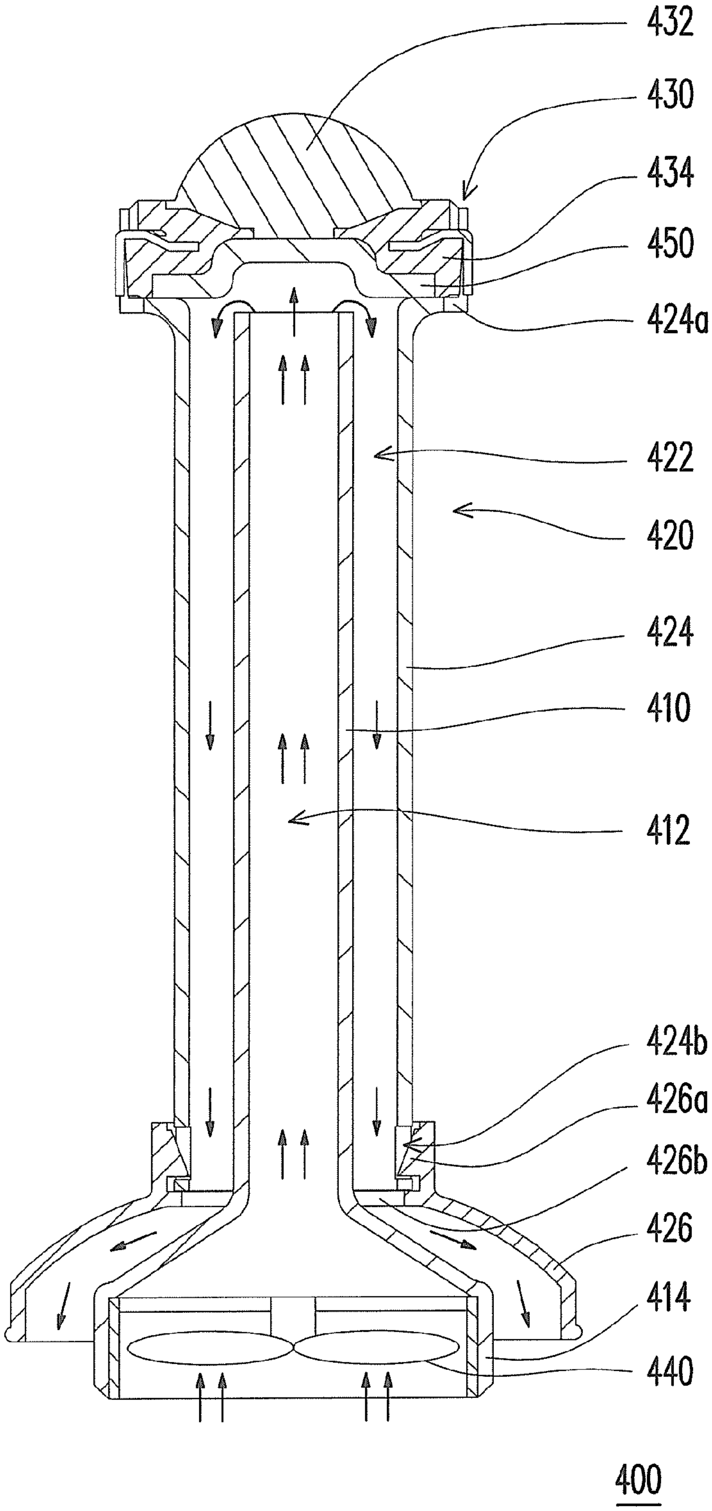
FIG. 12 is a cross-sectional side view of the light source device of FIG. 10 during operation.

FIG. 12 is a cross-sectional side view of the light source device 400 of FIG. 10 during operation.

Referring to FIG. 12, when the light emitting device 430 emit light, the generated heat is conducted to the heat conducting slug 450. Since the bottom surface of the heat conducting slug 450 leans against the fixing portion 424*a* of the sleeve 424, and the sleeve 424 is fabricated by a material with a high thermal conduction coefficient, the heat can be quickly absorbed by the sleeve 424. Now, the fan 440 also operates as the light emitting device 430 emits light, and extracts the external cool air for driving into the first air channel 412. The cool air flows towards the light emitting device 430 through the first air channel 412, and exchanges heat with the heat conducting slug 450 under the light emitting device 430, so as to take away the heat absorbed by the heat conducting slug 450. Now, after the heat exchange of the cool air, the air is exhausted from the second diversion pipe 420 through the second air channel 422, so as to maintain a normal operating temperature of the light emitting device 430.

According to the above design, the heat generated during the operation of the light emitting device 430 can be quickly taken away, so as to maintain the normal operating temperature of the light emitting device 430. When the cool air extracted by the fan 440 enters the first air channel 412, the cool air can directly exchange heat with the heat conducting slug 450 under the light emitting device 430, so that the heat generated by the light emitting device 430 can be quickly taken away through the heat exchange of the cool air. In other words, the cool air directly exchanges heat with the heat generating source, and then the hot air generated after the heat exchange is exhausted out of the second diversion pipe 420 through the second air channel 422. In a practice, the materials of the first diversion pipe 410 and the second diversion pipe 420 can be suitably selected, so that the thermal conduction coefficient of the first diversion pipe 410 is lower than that of the second diversion pipe 420, so as to avoid a large amount of heat exchange between the hot air flowing through the second air channel 422 and the cool air flowing through the first air channel 412.

Moreover, since the second diversion pipe 420 is fabricated by a material with a high thermal conduction coefficient, and the outer edge of the bottom surface of the heat conducting slug 450 under the light emitting device 430 leans against the fixing portion 424*a* of the sleeve 424, the heat generated by the light emitting device 430 can be conducted to the sleeve 424 through the heat conducting slug 450. When the air flows through the second air channel 422, the air also takes away the heat absorbed by the sleeve 424, so as to increase a heat exchange area, and accordingly improve the heat exchange efficiency.

Moreover, in the embodiment, the first diversion pipe 410 is sleeved by the second diversion pipe 420, so that the second air channel 422 is formed between the inner wall of the second diversion pipe 420 and the outer wall of the first diversion pipe 410. Therefore, the second air channel 422 and the first air channel 412 are side by side, which can effectively reduce a whole size and a weight of the light source device 400, and since the light emitting device 420 does not require heat dissipation fins, etc., an application level of the light source device 400 can be extended.

Figure 13:
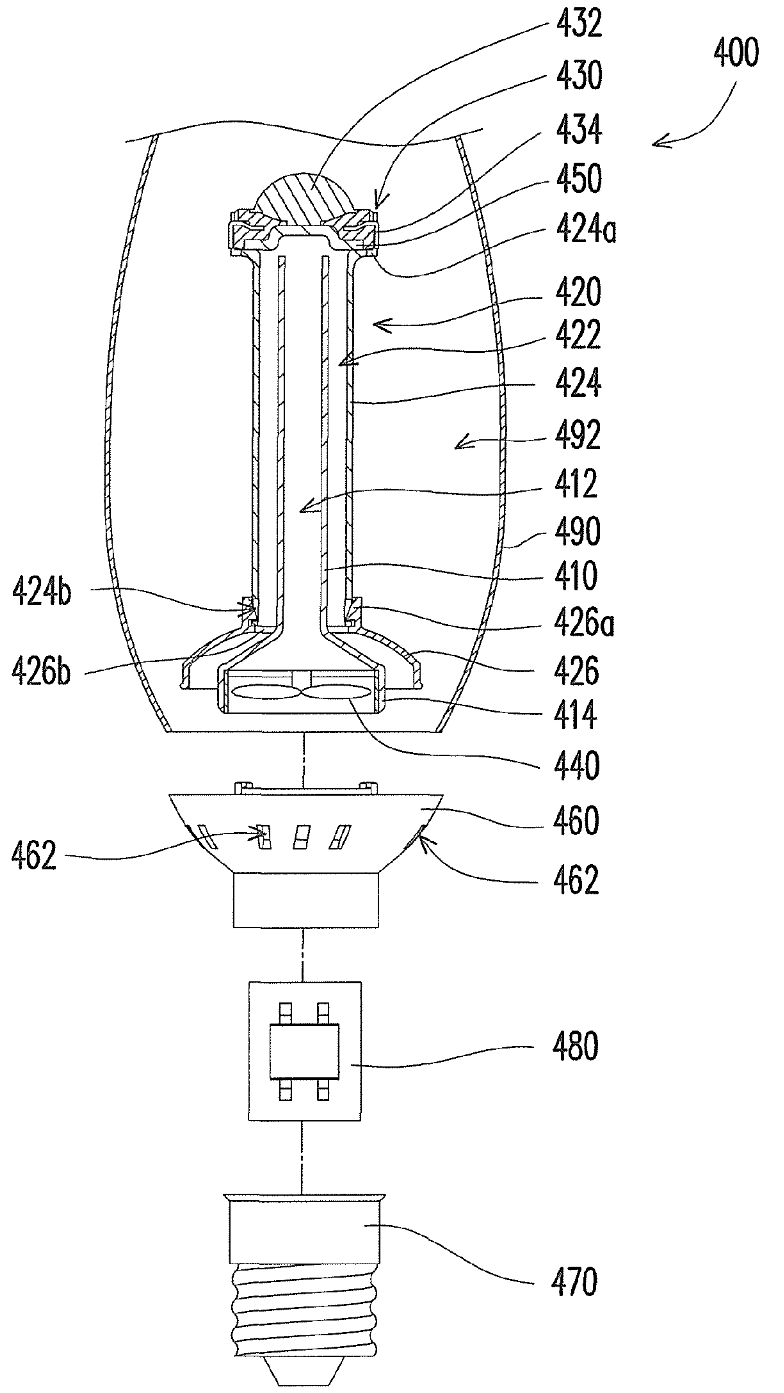
FIG. 13 is an exploded cross-sectional side view of a lamp formed by the light source device of FIG. 10.
Figure 14:
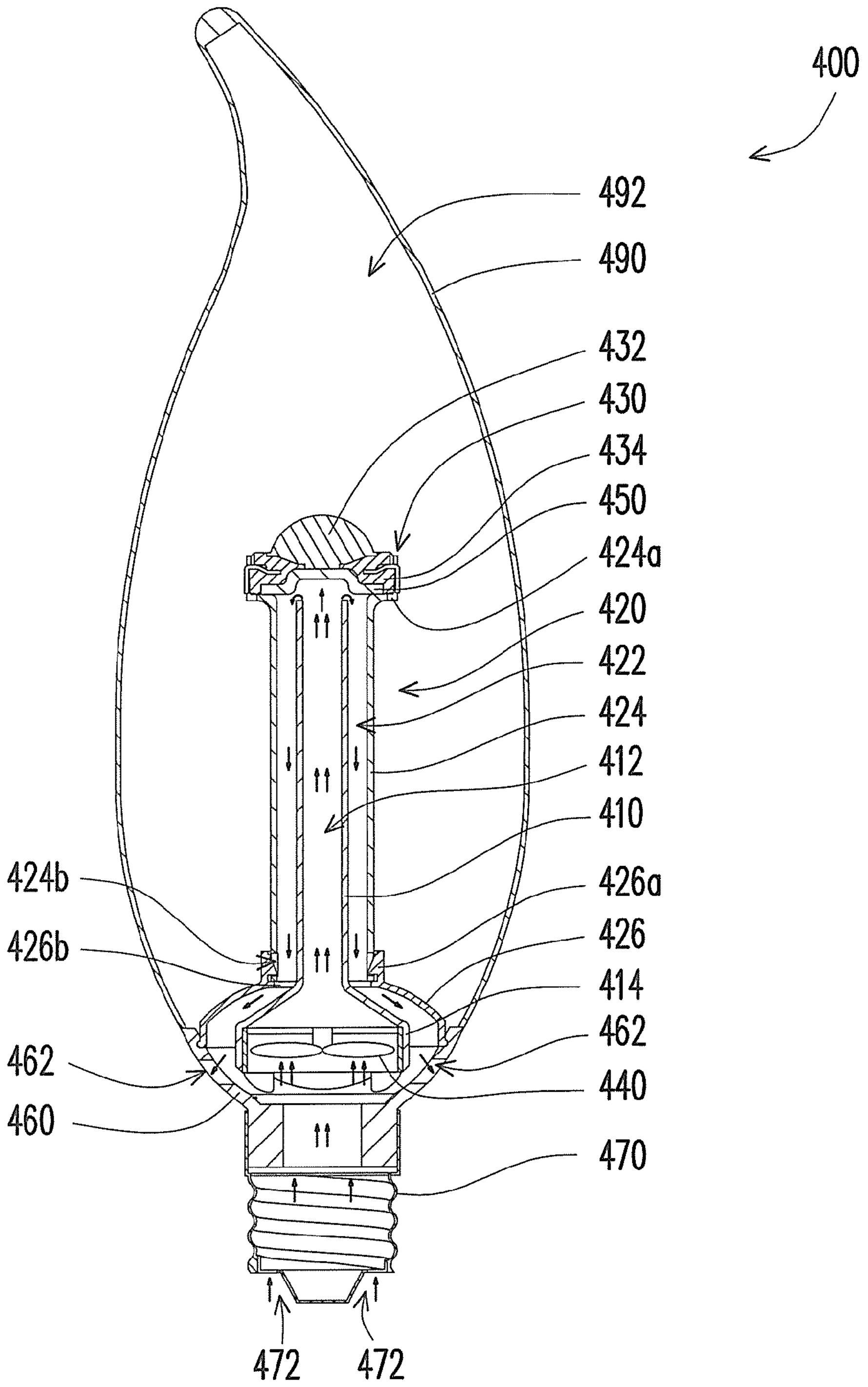
FIG. 14 is a cross-sectional side view of a lamp formed by the light source device of FIG. 10 during operation.

FIG. 13 is an exploded cross-sectional side view of a lamp formed by the light source device 400 of FIG. 10. FIG. 14 is a cross-sectional side view of a lamp formed by the light source device 400 of FIG. 10 during operation.

Referring to FIG. 13 and FIG. 14, when the light source device 400 is used to fabricate a lamp, lower ends of the first diversion pipe 410 and the second diversion pipe 420 are connected to a base 460, and the fan 440 is located between the first diversion pipe 410 and the base 460. A power connection base 470 used for connecting the external power is connected to the bottom of the base 460, and a control module 480 is disposed in the base 460. The control module 480 is, for example, a control circuit board, which is electrically connected between the power connection base 470, the fan 440 and the light emitting device 430. The power connection base 470 can be a thread-shaped pin or an electrical pin, wherein the thread-shaped power connection base 470 is, for example, in form of E12 or E27, and the electrical pin power connection base 470 is, for example, in form of MR16 or GU10.

Moreover, a lamp mask 490 is disposed on the top of the base 460, and the lamp mask 490 and the base 460 commonly form a containing space 492 for containing the first diversion pipe 410, the second diversion pipe 420, the light emitting device 430 and the fan 440. The lamp mask 490 can be a shell fabricated by a transparent or a translucent material such as glass, plastic etc. One or a plurality of third pores 472 is formed on a bottom surface of the power connection base 470, and the third pores 472 are connected to the first air channel 412. One or a plurality of fourth pores 462 is formed on a side surface of the base 460, and the fourth pores 462 are connected to the second air channel 422.

In this way, when the power connection base 470 is electrically connected to the external power, the control module 480 transmits electricity of the external power to the fan 440 and the light emitting device 430, so as to drive the fan 440 and the light emitting device 430. Now, the fan 440 extracts the external cool air through the third pores 472 on the bottom surface of the power connection base 470, and the cool air into the first air channel 412, so that the cool air exchanges heat with the bottom surface of the heat conducting slug 450 under the light emitting device 430, and the generated hot air is exhausted out of the second air channel 422 through the fourth pores 462 on the side surface of the base 460.

In the embodiment, since the cool air can enter the light source device and the hot air can be exhausted from the light source device without entering the lamp mask 490, the lamp mask 490 is not contaminated by external air, so as to avid loss of throughput of the light output through the lamp mask 490.

Figure 15:
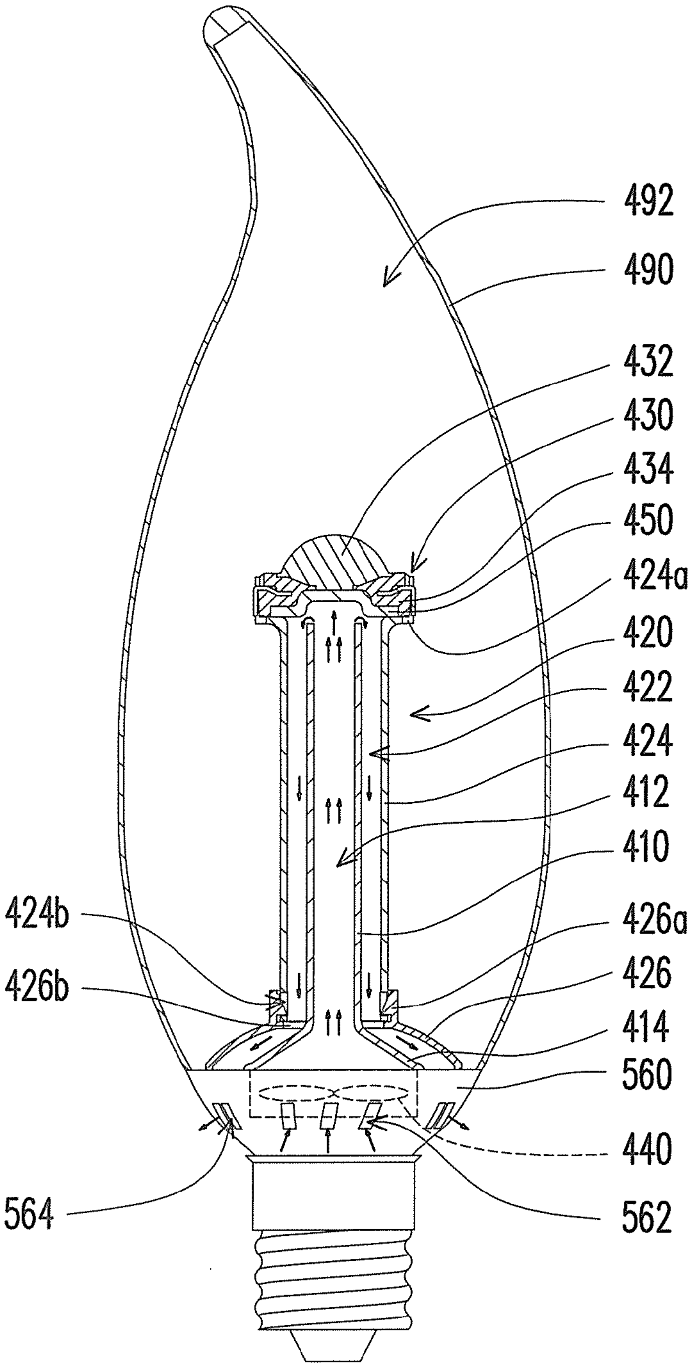
FIG. 15 is a cross-sectional side view of another lamp formed by the light source device of FIG. 10 during operation.

FIG. 15 is a cross-sectional side view of another lamp formed by the light source device of FIG. 10 during operation. A difference between the structure of FIG. 15 and the structure of FIGS. 10-14 is that in the lamp of FIG. 15, pores for air inflow and outflow are all disposed on a base 560. In detail, one or a plurality of third pores 562 and fourth pores 564 are formed on the side surface of the base 560. The third pores 562 are connected to the first air channel 412, and the fourth pores 564 are connected to the second air channel 422. In this way, the fan 440 can extract the external cool air through the third pores 562 for driving into the first air channel 412, and the cool air exchanges the heat with the bottom surface of the heat conducting slug 450 under the light emitting device 430, and then the hot air flowing in the second air channel 422 is exhausted through the fourth pores 564.

Actually, flowing directions of the air in the first air channel 412 and the second air channel 422 are not limited by the embodiments of FIGS. 10-15. Namely, an outflow direction of the air driven by the fan 440 can be inversed, i.e. the fan 440 originally extracting the external cool air can be changed to exhaust the hot air in the first air channel 412. In detail, based on the exhaustion of the fan 440, the cool air is driven to enter the second air channel 422 through the fourth pores 462 (or the pores 564), and the cool air exchanges the heat with the bottom surface of the heat conducting slug 450 under the light emitting device 430, and then the hot air flowing in the first air channel 412 is exhausted through the third pores 472 (or the pores 562) by the fan 440. Along with variation of the air flowing directions, the material characteristics of the first diversion pipe 410 and the second diversion pipe 420 can be exchanged. Namely, the first diversion pipe 410 is fabricated by a metal material with a high thermal conduction coefficient, and the second diversion pipe 420 is fabricated by a porous material with a low thermal conduction coefficient such as a porous porcelain material or a porous metal material, etc.

Figure 16:
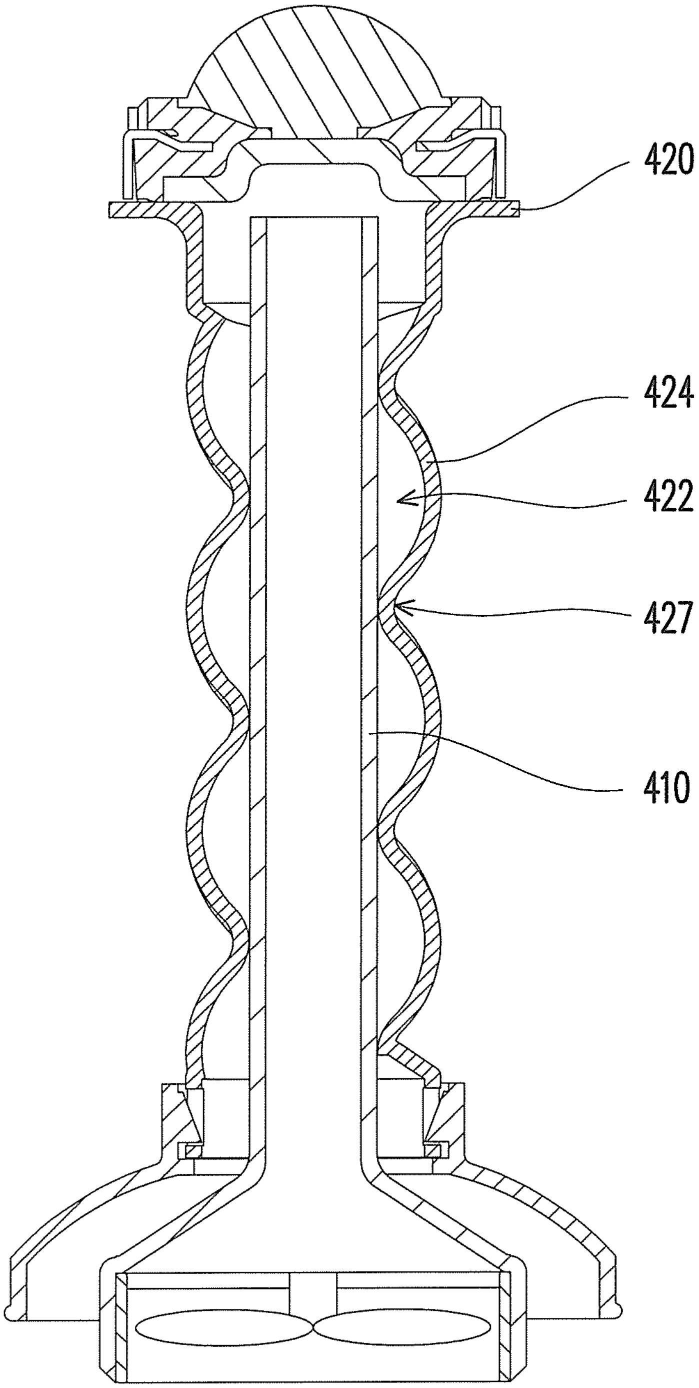
FIG. 16 is a cross-sectional side view of another light source device according to the third embodiment of the disclosure.

FIG. 16 is a cross-sectional side view of another light source device according to the third embodiment of the disclosure. As shown in FIG. 16, a pipe surface of the second diversion pipe 420 has a spiral shape, i.e. flanges 427 contacting the outer wall of the first diversion pipe 410 are convexly formed on the inner wall of the sleeve 424 of the second diversion pipe 420. In this way, the second air channel 422 becomes a helical channel winded along the first diversion pipe 410, so that the heat exchange area is increased, and the heat exchange efficiency is improved.

Actually, in an embodiment that is not illustrated, the spiral-shape first diversion pipe 410 can also be used, or the spiral-shaped first diversion pipe 410 and the second diversion pipe 420 can be simultaneously used, so as to achieve the similar effect.

Figure 17:
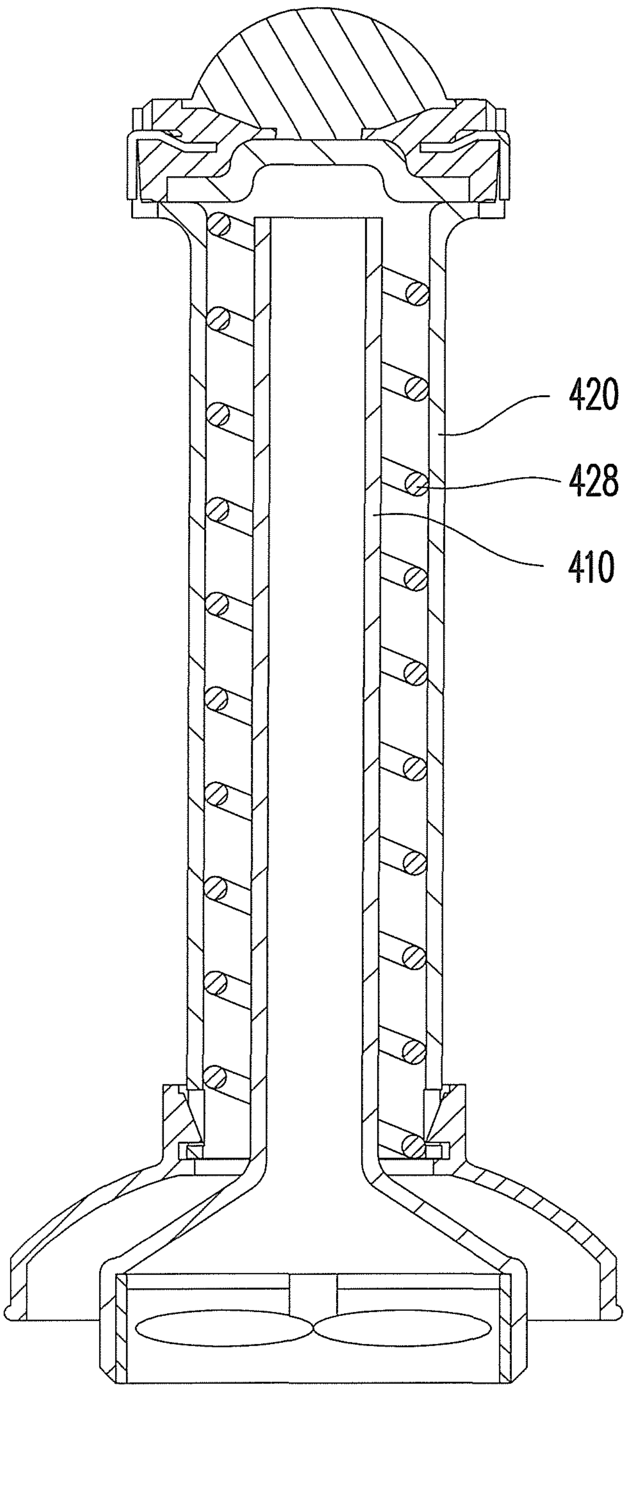
FIG. 17 is a cross-sectional side view of still another light source device according to the third embodiment of the disclosure.

FIG. 17 is a cross-sectional side view of still another light source device according to the third embodiment of the disclosure. In the embodiment, turbulence structures are disposed in the second air channel 422 between the first diversion pipe 410 and the second diversion pipe 420, so as to increase the heat exchange area and increase a heat exchange speed. As shown in FIG. 17, helical turbulence structures 428 (for example, helical springs) are formed on the inner wall of the second diversion pipe 420, so as to increase the heat exchange area through the turbulence structures 428. Certainly, the turbulence structures 428 can also be formed on the outer wall of the first diversion pipe 410, or after the first diversion pipe 410 and the second diversion pipe 420 are assembled, the turbulence structures 428 are disposed between the first diversion pipe 410 and the second diversion pipe 420, so as to achieve the same effect.

Fourth Embodiment

Figure 18:
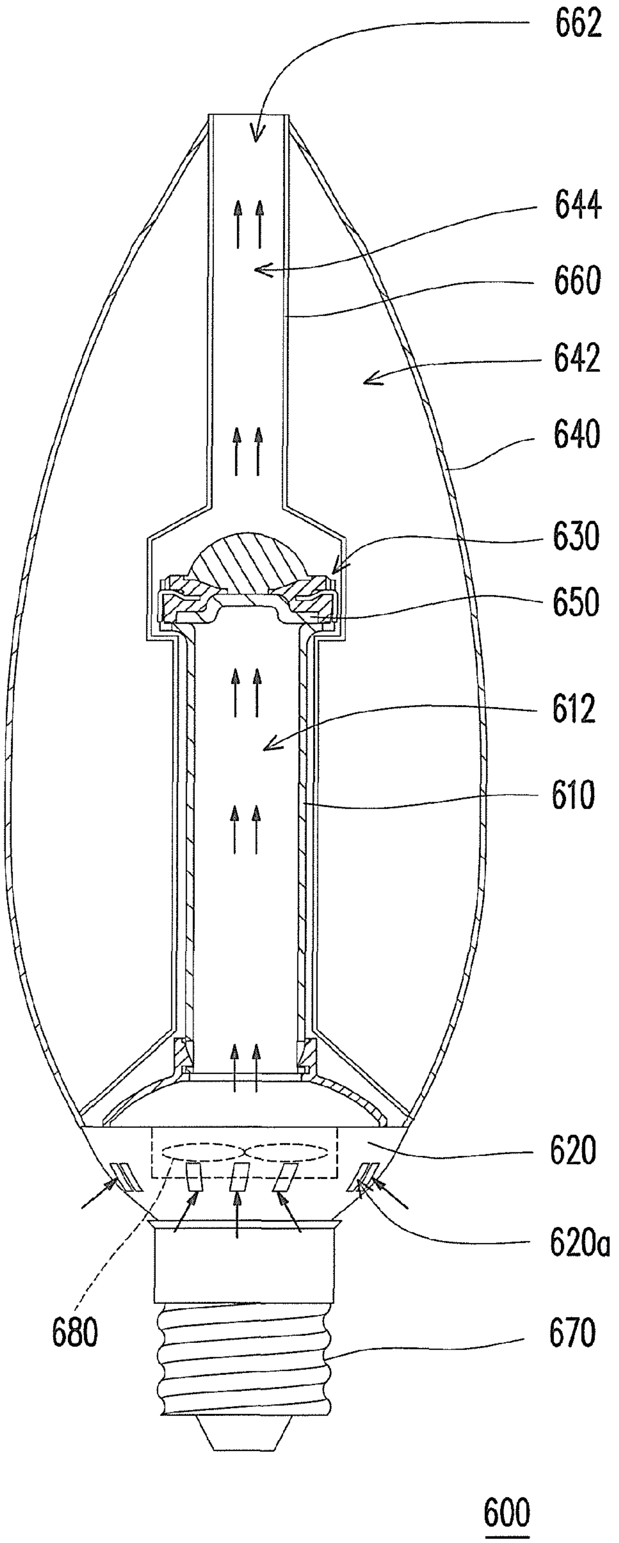
FIG. 18 is a cross-sectional side view of a light source device according to a fourth embodiment of the disclosure.
Figure 19:
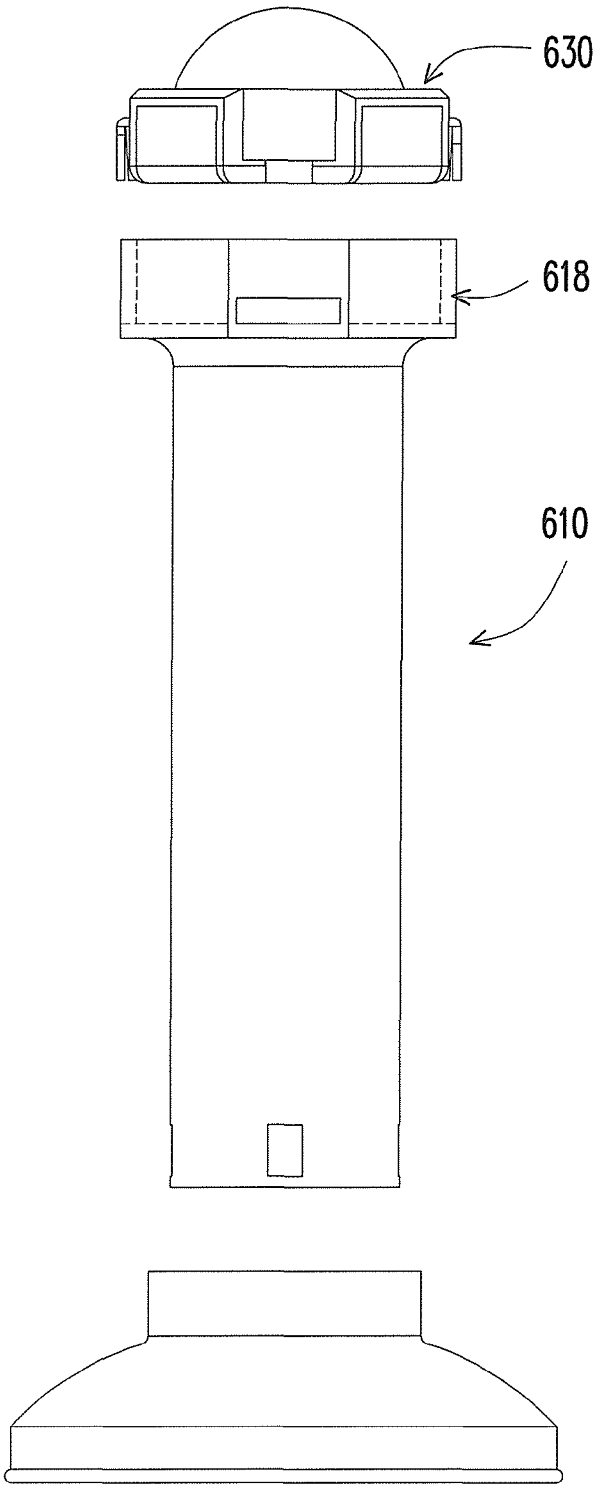
FIG. 19 is a three-dimensional exploded view of a diversion pipe and a light emitting device of FIG. 18.

FIG. 18 is a cross-sectional side view of a light source device according to a fourth embodiment of the disclosure. FIG. 19 is a three-dimensional exploded view of a diversion pipe and a light emitting device of FIG. 18.

Referring to FIG. 18 and FIG. 19, the light source device 600 includes a diversion pipe 610, a base 620, a light emitting device 630 and a lamp mask 640. The diversion pipe 610 has a first air channel 612 therein. The base 620 is connected to a lower edge of the diversion pipe 610. The base 620 has third pores 620*a*, and the third pores 620*a* are connected to the first air channel 612. The light emitting device 630 is disposed on an upper edge of the diversion pipe 610. A heat conducting slug 650 is disposed on the bottom of the light emitting device 630, and a bottom surface of the heat conducting slug 650 leans against the upper edge of the diversion pipe 610. The lamp mask 640 is connected to an upper edge of the base 620, and the lamp mask 640 and the base 620 commonly form a containing space 642 for containing the diversion pipe 610 and the light emitting device 630. Structures and a coupling relation of the light emitting device 630 and the diversion pipe 610, and a coupling relation of the lamp mask 640 and the base 620 are similar as that described in the third embodiment, so that detailed descriptions thereof are not repeated.

In the embodiment, a second air channel 644 connected to external is formed in the lamp mask 640, which is, for example, formed by disposing another diversion pipe 660 in the lamp mask 640, wherein the diversion pipe 660 can penetrate through the lamp mask 640, and has an opening 662 connected to external at the upper edge of the lamp mask 640. The diversion pipe 610 is disposed in the diversion pipe 660, and the first air channel 612 and the second air channel 644 are connected at a place where the light emitting device 630 is located. In detail, one or a plurality of fourth pores 618 can be formed on the upper end of the diversion pipe 610 for connecting the first air channel 612 and the second air channel 644.

The light source device 600 of the embodiment further includes a power connection base 670. The power connection base 670 is connected to the bottom of the base 620 and is electrically connected to the light emitting device 630. Moreover, a control module (not shown) similar as that described in the aforementioned embodiment can also be disposed in the base 620 for conducting electricity of the external power to the light emitting device 630 through the power connection base 670, so as to drive the light emitting device 630.

When the light emitting device emits light to generate heat, the heat is conducted to the diversion pipe 610 through the heat conducting slug 650. The diversion pipe 610 exchanges the heat with the external cool air that enters the first air channel 612 through the third pores 620*a*. After the cool air absorbs the heat, the air rises due to a density reduction, and flows towards the light emitting device 630 through the first air channel 612, and further exchanges heat with the heat conducting slug 650 under the light emitting device 630. The air surrounding the light emitting device 630 takes away the heat absorbed by the heat conducting slug 650, and rises to enter the second air channel 644 through the fourth pores 618, and then the air is exhausted to external through the opening 662 of the diversion pipe 660, so as to maintain a normal operating temperature of the light emitting device 630.

In other words, the air in the first air channel 612 and the second air channel 644 can be automatically convected to achieve a heat dissipation effect without assisting of an external force. Certainly, in the embodiment, a fan 680 can also be disposed at the lower end of the diversion pipe 610. The fan 680 is located between the diversion pipe 610 and the base 620, and is electrically connected to the control module (not shown) in the base 620, so as to accelerate a convection speed of the air in the first air channel 612 and the second air channel 644, and accordingly improve the heat exchange efficiency.

The disclosure is directed to a light source device having a good heat dissipation efficiency. In summary, the disclosure provides a light source device integrated with a heat dissipation structure, in which the heat generated by the light emitting device can be conducted to the base fabricated by a porous material through the heat conducting mask or the heat conducting pipe. Due to a large area contact between the heat conducting mask or the heat conducting pipe and the base, the heat can be evenly conducted to the base, so that the base can absorb the heat and dissipate the heat to external, so as to improve a heat dissipation efficiency. Moreover, in the light source device of the disclosure, the heat exchange of the light emitting device can be directly carried on through air convection, so that the heat generated by the light emitting device can be taken away from the light source device through heat exchange of the cool air.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A light source device, comprising:

a first diversion pipe, having a first end and a second end opposite to the first end, and having a first air channel;

a second diversion pipe, having a first end and a second end opposite to the first end, wherein the first diversion pipe is sleeved by the second diversion pipe, the first end of the first diversion pipe is adjacent to the first end of the second diversion pipe, a second air channel is formed between the first diversion pipe and the second diversion pipe, and an air-flowing direction of the first air channel is parallel and opposite to an air-flowing direction of the second air channel;

a light emitting device, connected to the first end of the second diversion pipe, wherein the first air channel and the second air channel are connected at a place where the light emitting device is located;

a fan, disposed at the second end of the first diversion pipe;

a base connected to the second end of the first diversion pipe and the second end of the second diversion pipe, wherein the fan is located between the first diversion pipe and the base; and a power connection base, connected to a bottom of the base and electrically connected to the light emitting device and the fan, wherein a bottom surface of the power connection base has a first pore, and the first pore is connected to the first air channel, the base has a second pore, and the second pore is connected to the second air channel.

2. The light source device as claimed in claim 1, further comprising a heat conducting slug disposed between the light emitting device and the first end of the second diversion pipe.

3. The light source device as claimed in claim 1, further comprising a lamp mask connected to the base, wherein the lamp mask and the base commonly form a containing space, and the first diversion pipe, the second diversion pipe, the light emitting device and the fan are located in the containing space.

4. The light source device as claimed in claim 1, wherein the second air channel is a helical channel winded along the first diversion pipe.

5. The light source device as claimed in claim 4, wherein a pipe surface of the second diversion pipe has a spiral shape.

6. The light source device as claimed in claim 1, further comprising a turbulence structure located in the second air channel.

7. The light source device as claimed in claim 6, wherein the turbulence structure comprises a helical structure formed on the first diversion pipe or the second diversion pipe.

8. The light source device as claimed in claim 6, wherein the turbulence structure comprises a helical spring disposed between the first diversion pipe and the second diversion pipe.

9. The light source device as claimed in claim 1, wherein a material of the first diversion pipe comprises a porous material.

10. The light source device as claimed in claim 9, wherein the porous material comprises a porcelain material or a porous metal material.

11. The light source device as claimed in claim 1, wherein a material of the second diversion pipe comprises a metal material.

12. A light source device, comprising:

a first diversion pipe, having a first end and a second end opposite to the first end, and having a first air channel;

a second diversion pipe, having a first end and a second end opposite to the first end, wherein the first diversion pipe is sleeved by the second diversion pipe, the first end of the first diversion pipe is adjacent to the first end of the second diversion pipe, a second air channel is formed between the first diversion pipe and the second diversion pipe, and an air-flowing direction of the first air channel is parallel and opposite to an air-flowing direction of the second air channel;

a light emitting device, connected to the first end of the second diversion pipe, wherein the first air channel and the second air channel are connected at a place where the light emitting device is located;

a fan, disposed at the second end of the first diversion pipe; and a base, connected to the second end of the first diversion pipe and the second end of the second diversion pipe, wherein the fan is located between the first diversion pipe and the base, the base has a first pore and a second pore, the first pore is connected to the first air channel, and the second pore is connected to the second air channel.

13. The light source device as claimed in claim 12, further comprising a heat conducting slug disposed between the light emitting device and the first end of the second diversion pipe.

14. The light source device as claimed in claim 12, further comprising a lamp mask connected to the base, wherein the lamp mask and the base commonly form a containing space, and the first diversion pipe, the second diversion pipe, the light emitting device and the fan are located in the containing space.

15. The light source device as claimed in claim 12, wherein the second air channel is a helical channel winded along the first diversion pipe.

16. The light source device as claimed in claim 15, wherein a pipe surface of the second diversion pipe has a spiral shape.

17. The light source device as claimed in claim 12, further comprising a turbulence structure located in the second air channel.

18. The light source device as claimed in claim 17, wherein the turbulence structure comprises a helical structure formed on the first diversion pipe or the second diversion pipe.

19. The light source device as claimed in claim 17, wherein the turbulence structure comprises a helical spring disposed between the first diversion pipe and the second diversion pipe.

20. The light source device as claimed in claim 12, wherein a material of the first diversion pipe comprises a porous material.

21. The light source device as claimed in claim 20, wherein the porous material comprises a porcelain material or a porous metal material.

22. The light source device as claimed in claim 12, wherein a material of the second diversion pipe comprises a metal material.

23. The light source device as claimed in claim 1, wherein a thermal conduction coefficient of the second diversion pipe is different from a thermal conduction coefficient of the first diversion pipe.

24. The light source device as claimed in claim 12, wherein a thermal conduction coefficient of the second diversion pipe is different from a thermal conduction coefficient of the first diversion pipe.

* * * * *